United States Patent
Takamoto

(10) Patent No.: US 7,062,674 B2
(45) Date of Patent: Jun. 13, 2006

(54) MULTIPLE COMPUTER SYSTEM AND METHOD FOR ASSIGNING LOGICAL COMPUTERS ON THE SAME SYSTEM

(75) Inventor: Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 562 days.

(21) Appl. No.: 10/336,711

(22) Filed: Jan. 6, 2003

(65) Prior Publication Data

US 2003/0217088 A1   Nov. 20, 2003

(30) Foreign Application Priority Data

May 15, 2002   (JP)   ............... 2002-140084

(51) Int. Cl.
*G06F 11/00*   (2006.01)
(52) U.S. Cl. ............... 714/13; 714/11; 714/12; 714/10
(58) Field of Classification Search ............ 714/10, 714/11, 12, 13
See application file for complete search history.

(56) References Cited

U.S. PATENT DOCUMENTS

| | | | |
|---|---|---|---|
| 5,345,590 A | | 9/1994 | Ault et al. |
| 5,371,848 A | * | 12/1994 | Casey et al. ............... 715/823 |
| 6,587,938 B1 | * | 7/2003 | Eilert et al. ............... 712/29 |
| 6,728,746 B1 | * | 4/2004 | Murase et al. ............... 718/1 |

* cited by examiner

*Primary Examiner*—Robert Beauschel
*Assistant Examiner*—Charles Ehne
(74) *Attorney, Agent, or Firm*—Reed Smith LLP; Stanley P. Fisher, Esq.; Juan Carlos A. Marquez, Esq.

(57) ABSTRACT

High reliability is achieved against hardware failures by use of logical computers. In plural logical computers using computers comprising plural physical processors, in cases where a highly reliable system is built using the plural logical computers, the logical computers are assigned to different physical processors. During failure recovery, reduction in service is prevented by increasing processor amounts of other active logical computers of the highly reliable system.

5 Claims, 13 Drawing Sheets

FIG. 8

| PROCESSOR NUMBER (801) | TOTAL AMOUNT OF PROCESSOR (802) | AMOUNT OF EMPTY PROCESSOR (803) |
|---|---|---|
| 0 | 200 | 100 |
| 1 | 200 | 100 |
| 2 | 100 | 50 |
| 3 | 100 | 100 |

FIG. 9

| LOGICAL COMPUTER (901) | ASSIGNED PROCESSORS (902) | ASSIGNED AMOUNT OF PROCESSOR (903) | ASSIGNED AMOUNT OF MEMORY (904) | ASSIGNED DISK (905) | ASSIGNED NETWORK (906) |
|---|---|---|---|---|---|
| 0 | 0 | 50 | 1GB | 100GB | 0 |
| 1 | 1 | 50 | 1GB | 100GB | 1 |
| 2 | 0 | 25 | 2GB | 50GB | 0 |
| 3 | 1 | 25 | 3GB | 50GB | 1 |

FIG. 10

| SYSTEM 1001 | AMOUNT OF REQUIRED PROCESSORS 1002 | NUMBER OF CLUSTER 1003 | LOGICAL COMPUTER 1 1004 | LOGICAL COMPUTER 2 1005 |
|---|---|---|---|---|
| CLUSTER SYSTEM 1 | 100 | 2 | 0 | 1 |
| CLUSTER SYSTEM 2 | 50 | 2 | 2 | 3 | ns # MULTIPLE COMPUTER SYSTEM AND METHOD FOR ASSIGNING LOGICAL COMPUTERS ON THE SAME SYSTEM

BACKGROUND OF THE INVENTION

1. Field of the Invention

The present invention relates to technology for providing high reliability for a system using plural logical computers running on an identical physical processor.

2. Description of the Prior Art

The advance of processor technology has enabled high-performance processors to be easily used. Conventionally, insufficient performance has been covered by running plural logical computers in parallel. With the advent of high-performance processors, however, performance has been satisfied and concerns are shifting to how to effectively use the high-performance processors. A logical computer function is one approach to the effective use of the high-performance processors. The logical computer function is technology for creating plural virtual computers from one physical computer. For example, if one physical processor is assigned to plural logical computers in a timesharing mode, it could appear to software that plural computers exist. This function allows effective use of one high-performance processor. There is an example that further develops the logical computer function to provide higher reliability. In US005345590A, a description is made of a method which builds a hot standby with two logical computers, and when one of them fails, switches to another logical computer to continue processing. The hot standby method is a method for achieving high reliability usually with different computers. According to this technology, two different computers are provided so that processing is normally performed by one computer, and if a failure occurs, switching is made to another standby computer without stopping processing. In US005345590A, a hot standby is built between two logical computers created on an identical physical computer. This contributes to an increase in reliability of system level.

In the US005345590A, a description is made of a method which increases reliability by building a hot standby with two logical computers. Although this method describes a method for increasing the reliability of software level, a reliability method combined with hardware is not described. A problem with the US005345590A is that, when one physical processor is disabled due to a hardware failure, plural logical computers configured on the physical processor to build a hot standby fail at the same time, making the hot standby useless. For example, if two logical computers are created on one physical processor to build a hot standby, a failure of the physical processor would cause the logical computers built on the physical processor to be stopped.

SUMMARY OF THE INVENTION

To solve the above-described problem, in plural logical computers using a computer comprising plural physical processors, in cases where a highly reliable system is built using the plural logical computers, the logical computers are dispersedly assigned to different physical processors to achieve high reliability.

BRIEF DESCRIPTION OF THE DRAWINGS

FIG. 8 is a diagram showing a physical processor composition table in one embodiment of the present invention;

FIG. 9 is a diagram showing a logical processor composition table in one embodiment of the present invention;

FIG. 10 is a diagram showing a cluster table in one embodiment of the present invention;

DETAILED DESCRIPTION OF PREFERRED EMBODIMENTS

Figure 1:
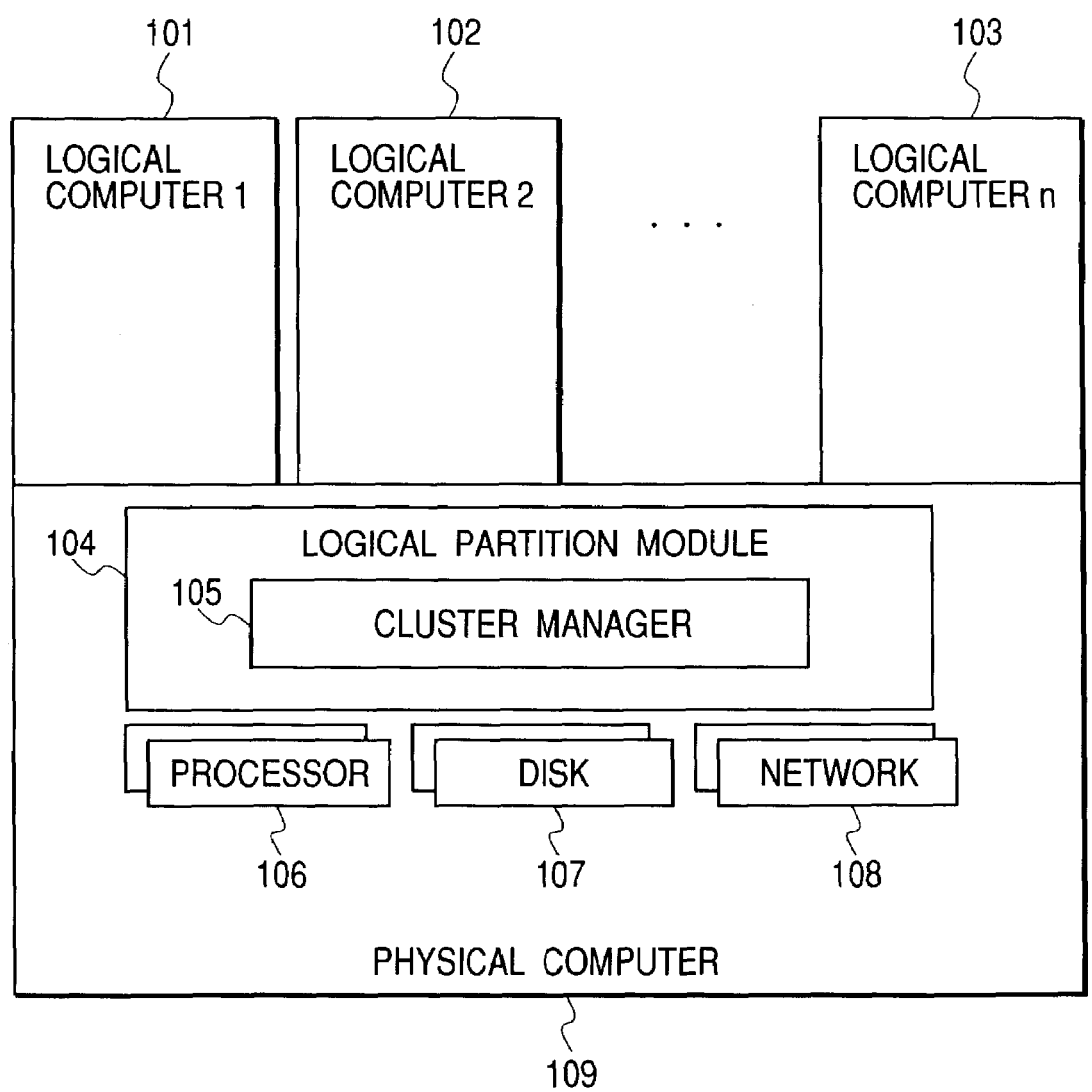
FIG. 1 is a diagram showing an overall configuration in one embodiment of the present invention.

FIG. 1 shows a schematic diagram of a multiple system in one embodiment of the present invention. The reference numerals 101 to 103 indicate logical computers, respectively, and 109 indicates a physical computer. The physical computer 109 comprises a physical processor 106, a disk unit 107, a network device 108, and a logical partition module 104. The logical partition module 104 has the functions of a cluster manager 105. The logical computers 101 to 103 are virtual computers created from resources of the physical computer 109. Each of the processor 106, disk unit 107, network device 108 possessed by the physical computer 109 is split for assignment to the logical computers 101 to 103. By this arrangement, software (not shown) running on the logical computers 101 to 103 can operate as if there were physical computers different from each other. Specifically, the processor and the network are assigned to the logical computers in a timesharing mode, and the disk unit and memory are split for assignment. This function is implemented by the logical partition module 104. In the present invention, the cluster manager 105 is added to conventional functions of the logical partition module 104 to make the logical computers 101 to 103 more reliable.

Figure 2:
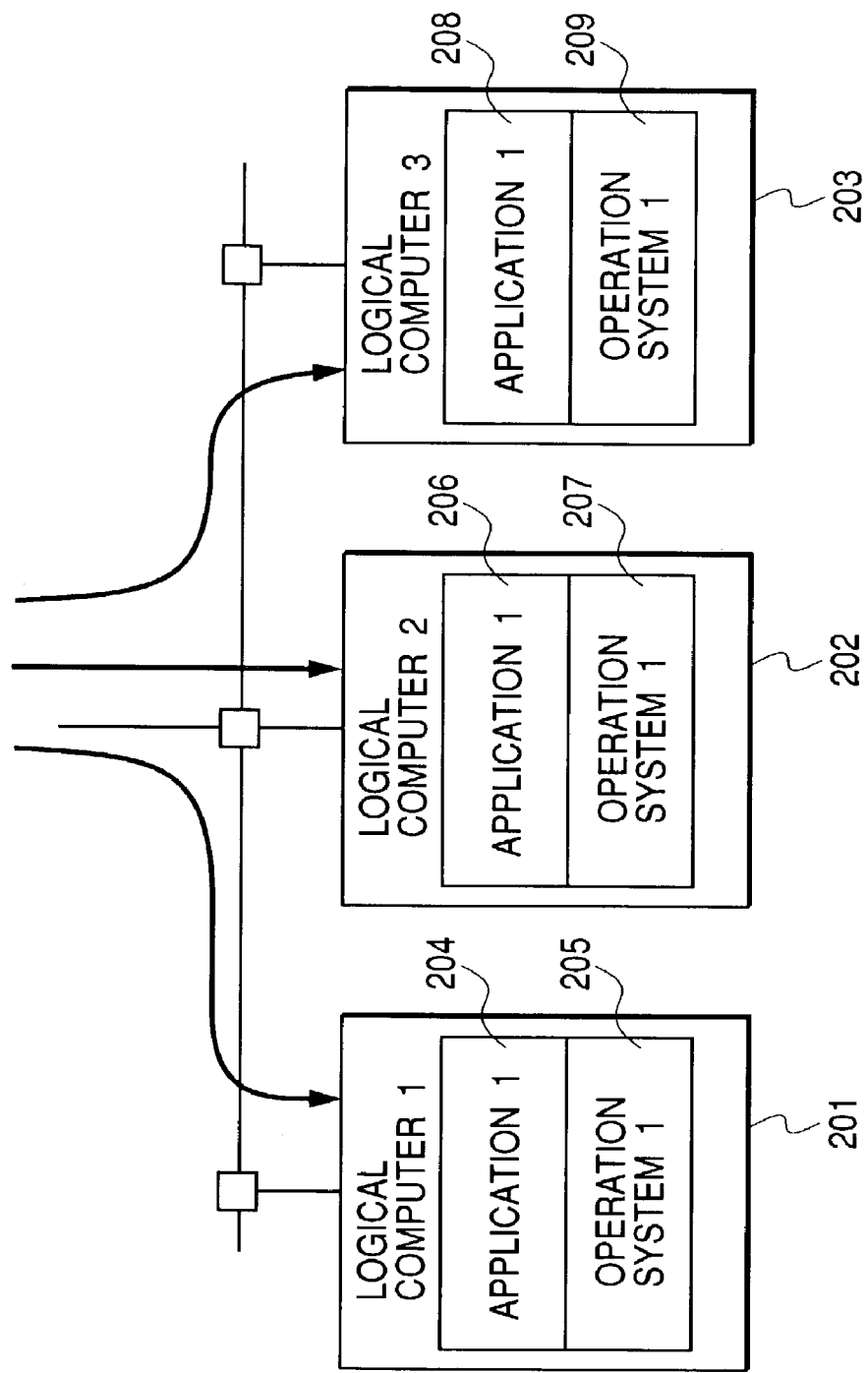
FIG. 2 is a diagram showing an outline of cluster processing in one embodiment of the present invention.

FIG. 2 shows how a cluster system created by the cluster manager 105 operates. Operating systems 205, 207, and 209, and applications 204, 206, and 208 operate in the logical computers 201 to 203, respectively. Software of the same functions operate on each of the logical computers 201 to 203. Processing requests issued over the network are processed in one of the logical computers 201 to 203 and processing results are returned to requesters. This clustering allows numerous processing requests to be processed at the same time. Even if a failure occurs in any of the logical computers, since the remaining computers can continue processing, higher reliability is obtained than in a single system. Although normally a cluster system comprises physical computers exactly different from each other, in the present invention, it is achieved using plural logical computers on a single physical computer.

Figure 3:
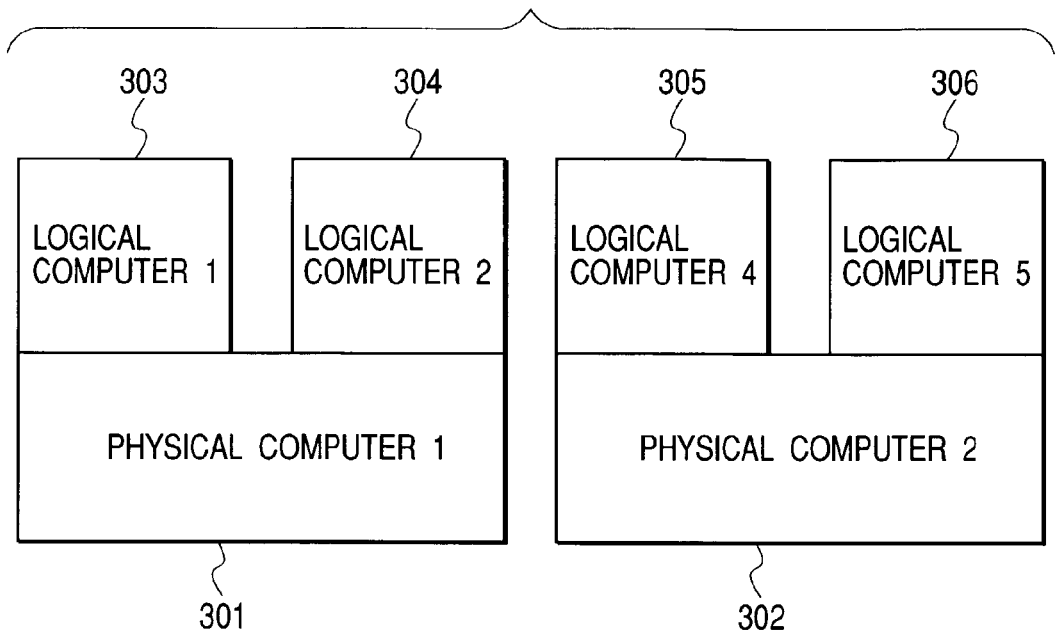
FIG. 3 is a diagram showing assignment of logical computers.

FIG. 3 shows a relationship of assignment of physical computers 301 and 302 and logical computers 303 to 306. The logical computers 303 and 304 comprise the same physical computer 301. The logical computers 305 and 306 comprise the same physical computer 302. The logical computers each, as described previously, are assigned computer resources such as a processor, a disk unit, and a network device. A cluster system operates regardless of any assignment to the logical computers. However, an assignment method is important to increase reliability. For example, in the case where a cluster system is built with the logical computer 1 (303) and the logical computer 2 (304), if a failure occurs in the physical computer 1 (301), the whole cluster system would fail. This would produce a problem that the advantages of the cluster system are reduced.

Figure 4:
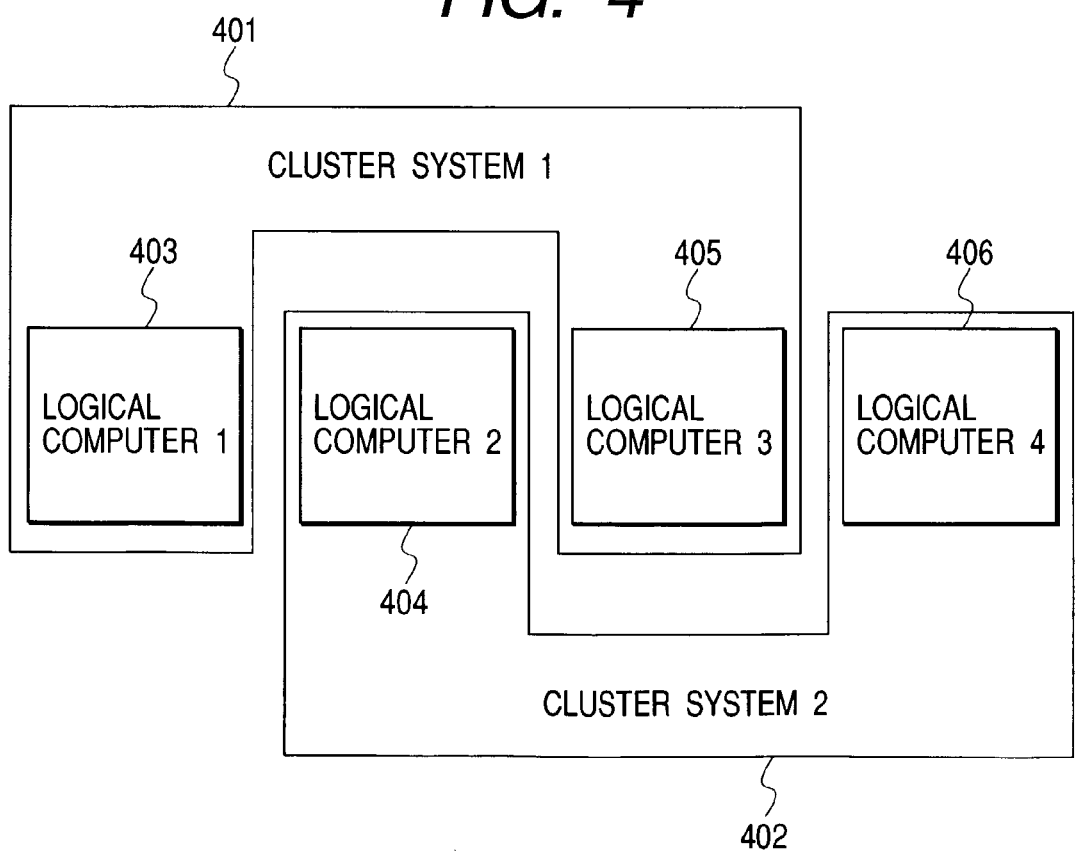
FIG. 4 is a diagram showing the clustering of logical computers in one embodiment of the present invention.
Figure 5:
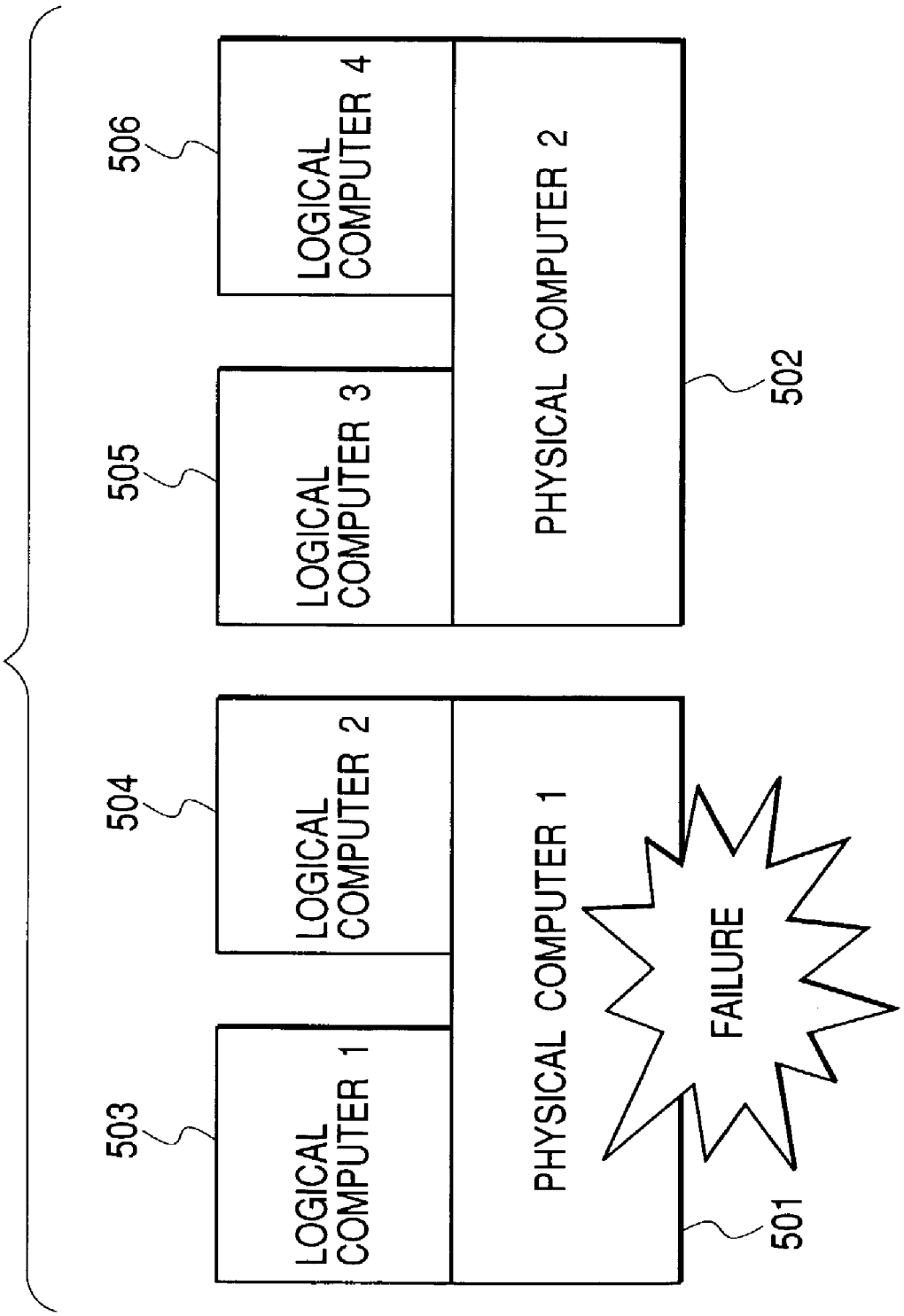
FIG. 5 is a diagram showing failure occurrence in one embodiment of the present invention.

One of the characteristics of the present invention is a method of assigning a highly reliable cluster system to logical computers. FIG. 4 shows cluster systems assigned based on the configuration shown in FIG. 3. A cluster system 1 (401) comprises a logical computer 1 (403) and a logical computer 3 (405), and a cluster system 2 (402) comprises a logical computer 2 (404) and a logical computer 4 (406). It is characteristic that the logical computers constituting each of the cluster systems are assigned dispersedly to different physical computers. With this configuration, the above-described reliability problem can be solved. That is, as shown in FIG. 5, when a failure occurs in a physical computer 1 (501), although a logical computer 1 (503) and a logical computer 2 (504) stop, since a logical computer 3 (505) and a logical computer 4 (506), each a counterpart of the clusters, can normally operate, the whole system never stops.

Figure 6:
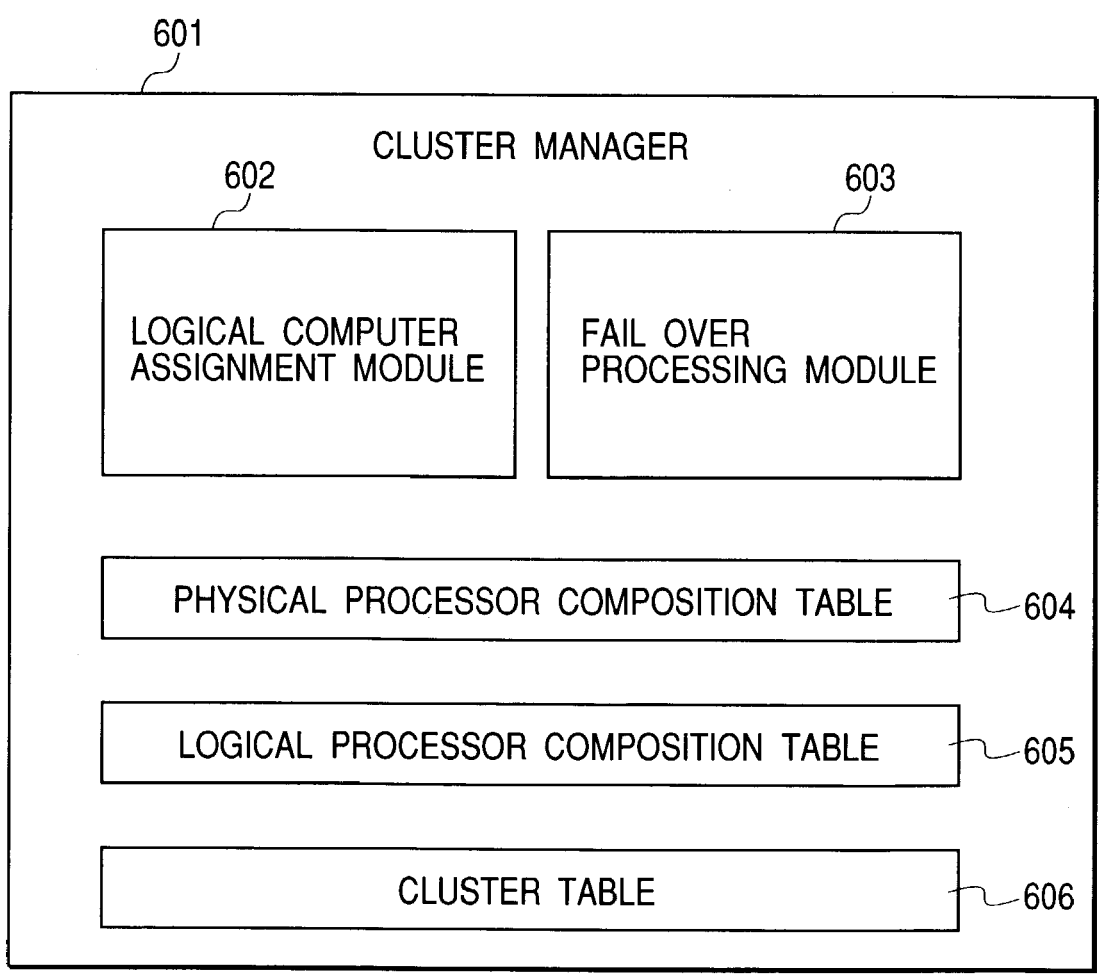
FIG. 6 is a diagram showing the configuration of a cluster manager in one embodiment of the present invention.

FIG. 6 shows the configuration of a cluster manager (601) for achieving this method. The cluster manager (601) comprises a logical computer assignment module (602), a fail over processing module (603), a physical processor composition table (604), a logical processor composition table (605), and a cluster table (606). The physical processor composition table (604) describes resources such as a processor, disk unit, and memory device possessed by a physical computer. The logical processor composition table (605) describes resources assigned to plural logical computers. The cluster table (606) contains information about a cluster assigned to the logical computers. The logical computer assignment module (602) has a function to assign a cluster system to the logical computers. The fail over processing module 603 has a function to perform processing when a logical computer assigned the cluster system stops due to a failure of the physical computer or software error within the logical computer. These functions can be performed by the hardware itself and achieved as software associated with the hardware.

Figure 7:
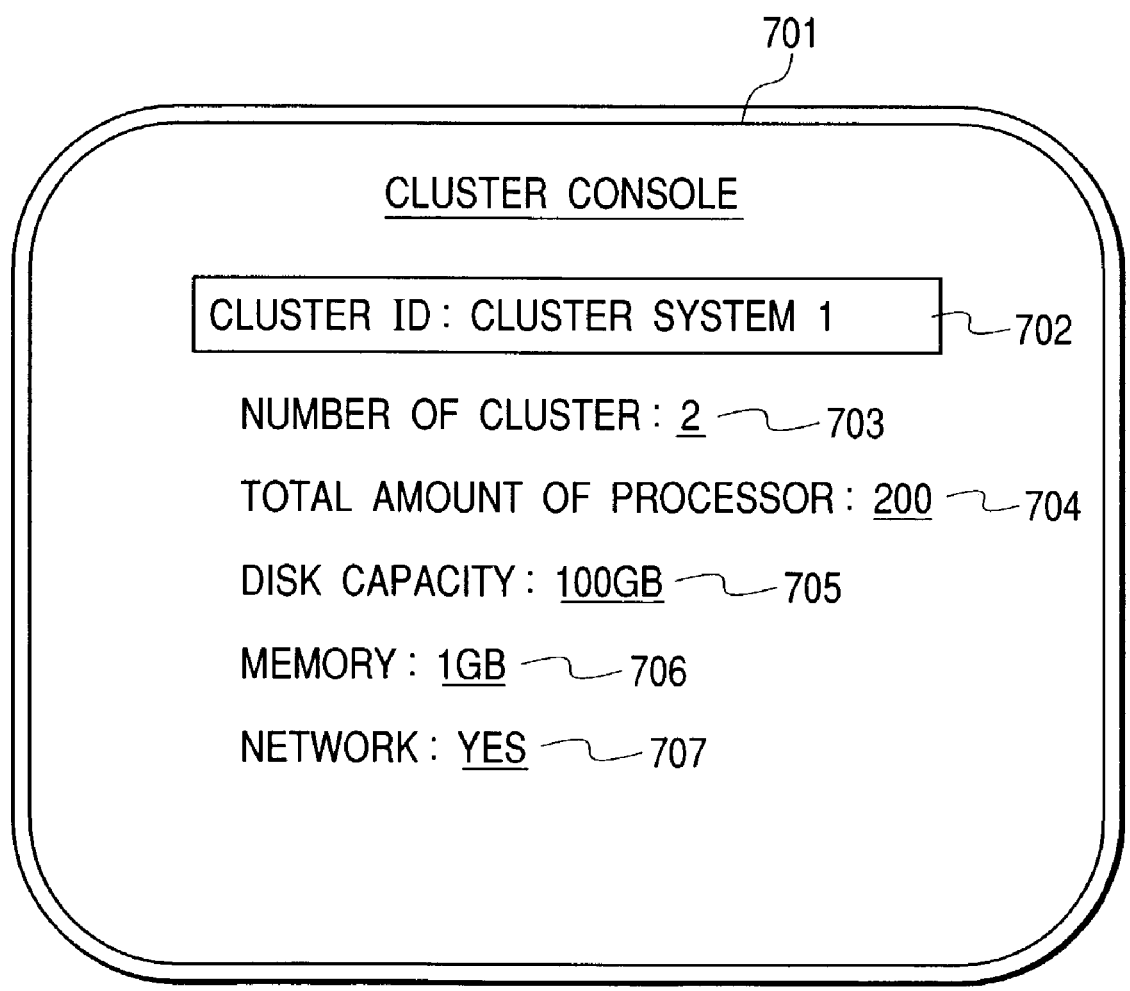
FIG. 7 is a diagram showing a cluster console in one embodiment of the present invention.

FIG. 7 shows a user interface when a cluster system is set. A user sets the cluster system by use of cluster console functions displayed on a console 701 of hardware. The reference numeral 702 indicates settings on the cluster system 1. 703 indicates the number (the number of clusters) of logical computers used in a cluster system 1. 704 indicates a total amount of processor of the cluster system. This is a number for deciding a service level. The user can set a minimum amount of service to be obtained by using the cluster system. 705 indicates a disk capacity per logical computer. This setting also applies to other logical computers of an identical cluster system. 706 indicates a memory capacity per logical computer. This setting also applies to other logical computers of an identical cluster system. 707 indicates whether to use a network. If the user of a network is specified, all logical computers within an identical cluster system can use the network.

FIG. 8 shows the configuration of the physical processor composition information table. This table contains a list of resources possessed by a physical computer. Column 801 indicates processor numbers. Column 802 indicates total processing amounts of processors. For example, MIPS (Million Instructions Per Sec) is used as the unit of processing amount. Column 803 indicates the amounts of empty processors. This amount is a processing amount not assigned to logical computers and the value of the column 803 is decreased if a logical computer is newly created. Although FIG. 8 shows only items on processors, also for memory, disk, and network, tables with the same items are created. These tables are referred to when logical computers are newly created.

FIG. 9 shows a logical processor composition table. This table contains information about resources assigned to created logical computers. Column 901 indicates the identifiers of logical computers. Column 902 indicates assigned processor numbers. Column 903 indicates the amounts of assigned processors. Column 904 indicates assigned memory amounts. Column 905 indicates capacities of assigned disks. Column 906 indicates the identifiers of assigned networks. If a cluster system is newly created and a new logical computer is assigned, the logical computer is added to this table. If a failure occurs in part of a certain cluster system, this table is used to create a logical computer having same resources.

FIG. 10 shows the organization of a cluster table. The cluster table shows how logical computers are assigned to created cluster systems. When a cluster system is newly created, its information is added to this table. Column 1001 indicates cluster system identifiers. The cluster identifiers 702 shown in FIG. 7 are stored in this column. Column 1002 indicates the amounts of required processors. The total amounts of processor 704 shown in FIG. 7 are stored in this column. Column 1003 stores the number of clusters (the number of logical computers). The number of clusters shown in FIG. 7 is stored in this column. Column 1004 and following columns indicate logical computer numbers assigned to the cluster systems. These columns increase or decrease depending on the preset number of clusters.

Figure 11:
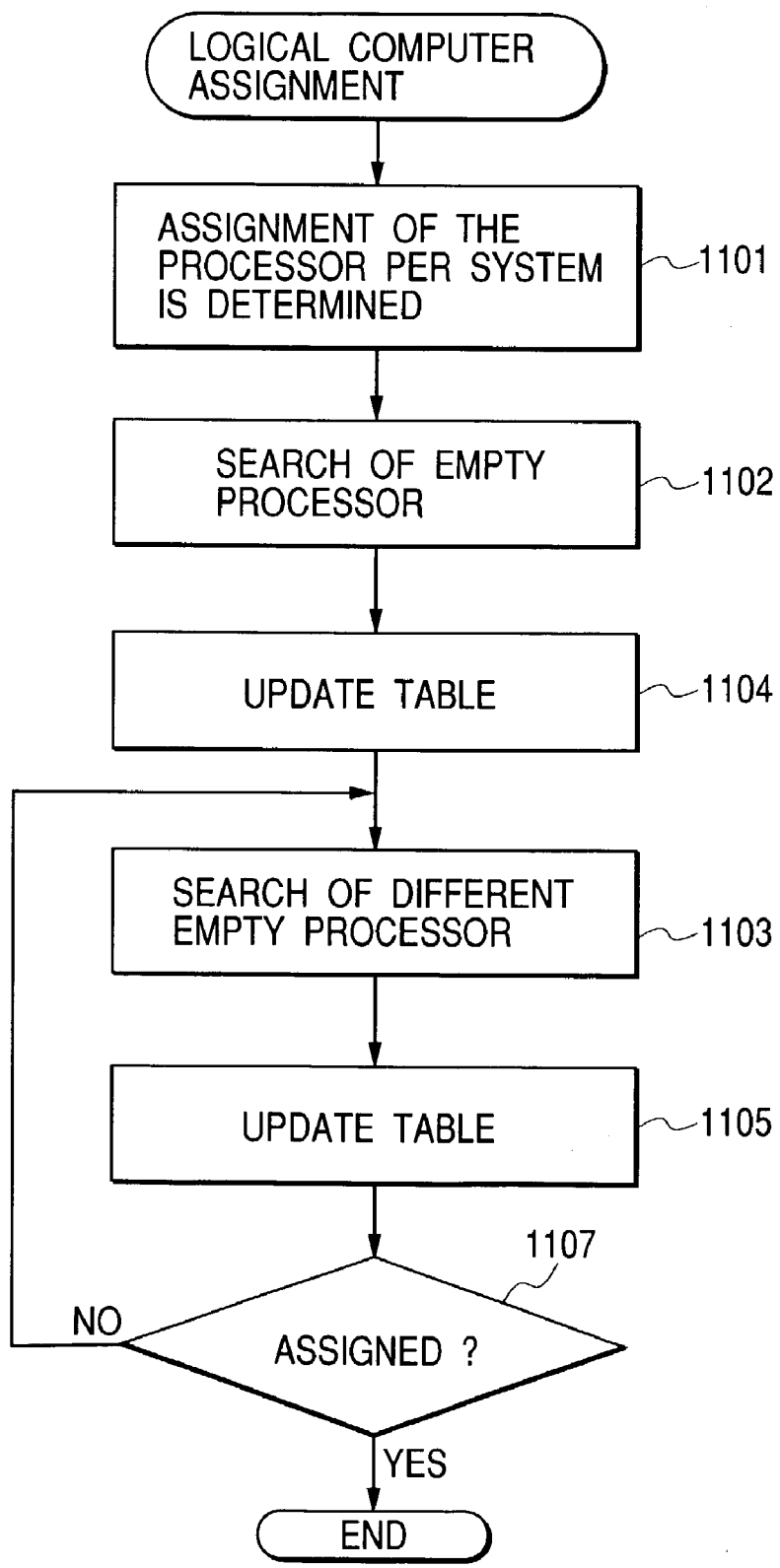
FIG. 11 is a diagram showing a flow of a logical computer assignment module in one embodiment of the present invention.

FIG. 11 shows a processing flow of the logical computer assignment module. Step 1100 finds a processor assignment amount per logical computer. It can be found by dividing the amount of required processors 1002 in the cluster table (FIG. 10) by the number of clusters 1003. Step 1102 searches the physical processor composition information management table (FIG. 8) for a physical processor having an empty processor amount. The physical processor is used to newly create a logical computer. Thus, the first logical computer to be assigned to a cluster system is decided. At this time, if possible, an assignment should be made so as to leave an empty processor amount for the physical processor. This is because processing at the occurrence of a failure can be simplified. As another reason, when a failure occurs in a physical computer, the amount of one active processor is increased until a logical computer to constitute the cluster system is newly created; if an empty processor amount is present, a processor amount can be easily increased. Step 1104 updates the table. In the physical processor composition table, the empty processor amounts 803 are decreased by an amount assigned to a logical computer. The logical processor composition table (FIG. 9) is added with information of the assigned logical computer. Step 1103, like step 1102, searches the next physical processor to be assigned to the cluster system. In this case, physical processors different from the physical processors having been so far assigned are searched for. By doing so, identical physical processors are not assigned when an identical cluster system is built. Step 1105 updates the table. In the physical processor composition management table, the empty processor amounts 803 are decreased by an amount assigned to a logical computer. The logical processor composition table is added with information of the assigned logical computer. Step 1107 determines whether all cluster systems have been assigned (whether all logical computers to be assigned to the cluster systems have been assigned), and if there is a cluster system not yet assigned, control goes to step 1103. By this processing, the logical computers are easily assigned to the cluster systems and physically different processors are assigned in an identical cluster system. As a result, a system resistant to failure of physical processors can be built. As another assignment method, when the number of logical computers is smaller than the number of physical processors, the logical computers may be assigned to the physical processors as evenly as possible. In other words, if there are only two physical processors when four logical computers are to be created, two logical computers are assigned to each of the physical processors. Since uneven assignment would cause great changes in processing amounts at the time of failure, assignment should be made as evenly as possible.

Figure 12:
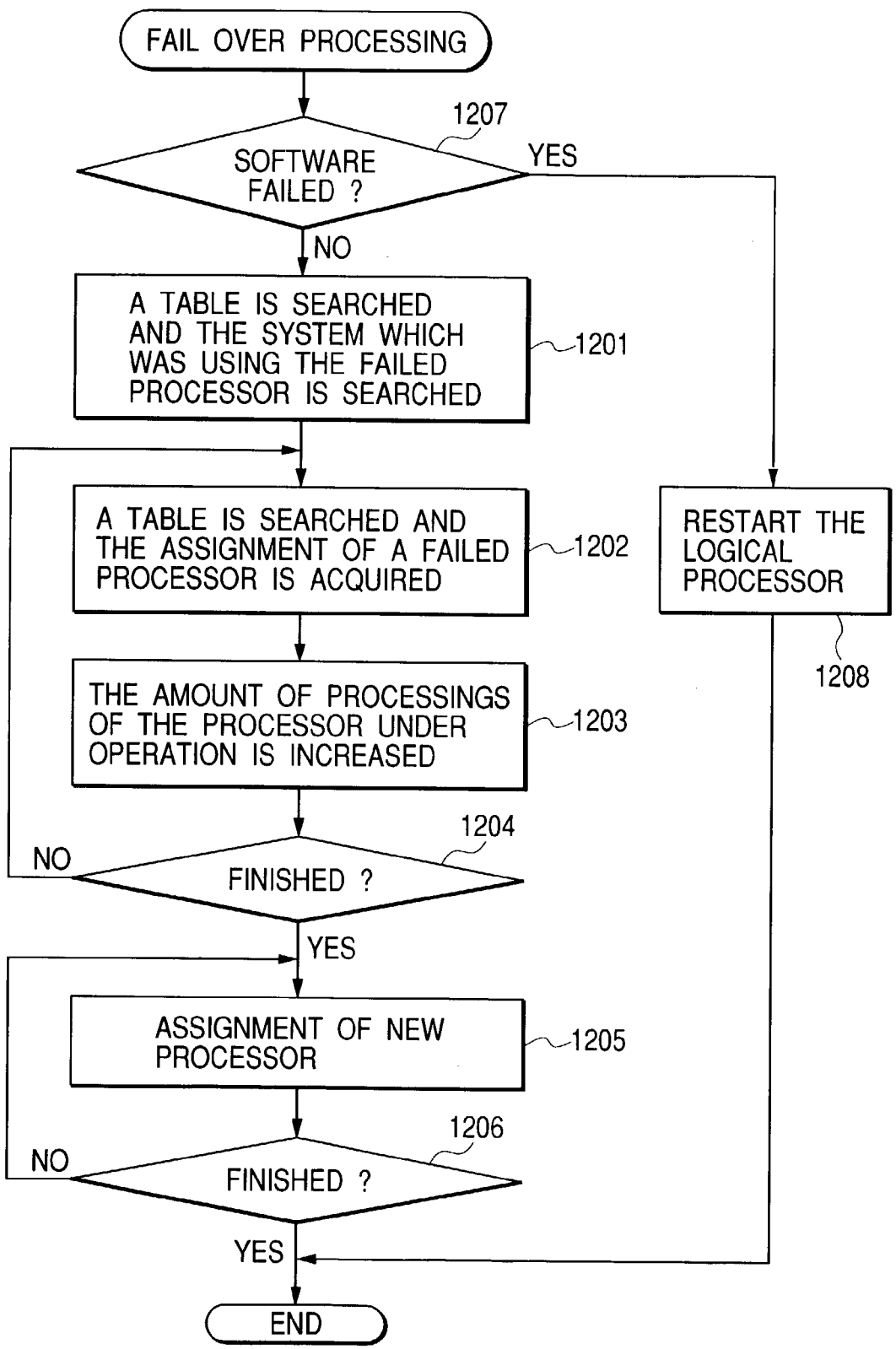
FIG. 12 is a diagram showing a flow of a fail over processing module in one embodiment of the present invention.

FIG. 12 shows a processing flow of the fail over processing module. Step 1207 determines whether a hardware or software failure occurs, and for a software failure, control goes to step 1208 to reactivate a logical computer. If a failure occurs, some interrupt occurs. By checking the type of the interrupt, what failure occurs can be determined. For a hardware failure, control goes to step 1201 to newly assign resources. Step 1201 searches for a logical computer which was using a failed processor. Column 902 of the logical processor composition table (FIG. 9) is searched to find a logical computer which was using a failed processor. Step 1202 determines a required processor amount from the logical processor composition management table. Step 1203 increases the amount of processing of a normal system under operation. If an empty processor amount exists in a physical processor currently assigned, it is added. If no empty processor amount exists in the physical processor currently assigned, an empty physical processor is added (a processor amount is obtained from another processor having an empty processor amount). Step 1204 repeats the steps 1202 and 1203 by the number of systems under operation. This processing, to maintain a service level, increases a processor processing amount of the system under operation by a processor processing amount having been assigned to a failed processor. For example, if a cluster system is configured with three logical computers to each of which a processing amount of 100 is assigned and a failure occurs in one of the logical computers, the processing amount of the whole cluster system would decrease by 100. In this case, if each of the processor processing amounts of the two logical computers is increased by 50, the whole processor processing amount can be restored to 300. If a desired processing amount cannot be obtained by one physical processor, service is maintained by newly adding a physical processor.

As another addition method, instead of evenly adding the processor processing amounts of logical computers under operation, only the processor processing amounts of specific logical computers may be added. In this case, although processor processing amounts become uneven among the logical computers, the processor processing amount of the whole cluster system can be maintained. Step 1205 assigns a new processor. In this step, processing is performed so that different physical processors are assigned in an identical cluster system, and a new logical computer is assigned for a failed system. Step 1206 repeats the step 1205 by the number of failed logical computers.

Figure 13:
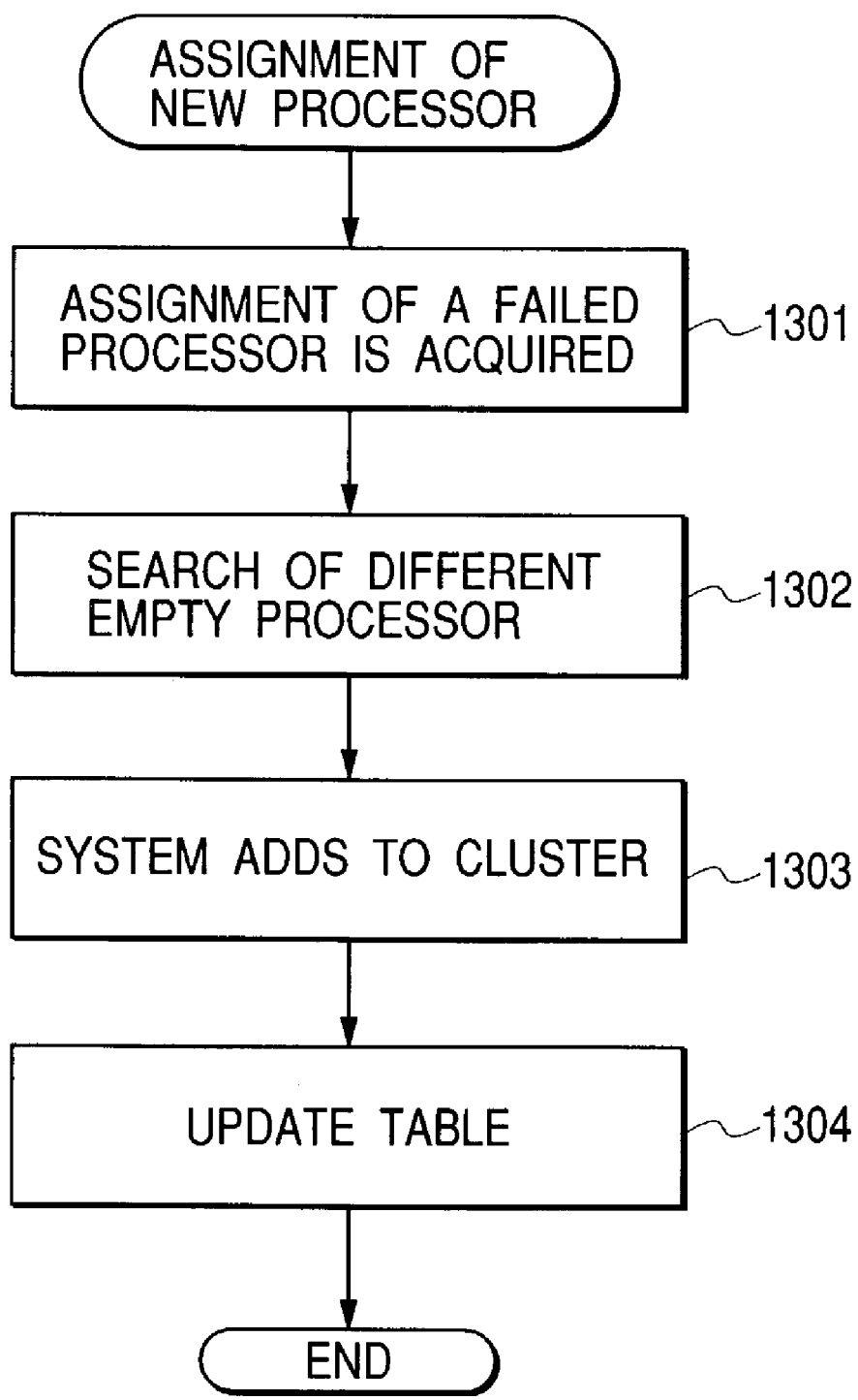
FIG. 13 is a diagram showing a flow of assignment of a new processor in one embodiment of the present invention.

FIG. 13 is a detailed flowchart showing new processor assignment of the step 1205 in FIG. 12. To assign a new processor, an empty physical processor is used to create a new logical computer. Step 1301 finds a processor assignment amount per system. It can be found by dividing the amount of required processors 1002 in the cluster table (FIG. 10) by the number of clusters 1003. The physical processor composition information management table is searched for a physical processor having an empty processor amount. Thus, the first logical computer to be assigned to a cluster system is decided. The decided physical processor is used to newly create a logical computer. Step 1302 searches the physical processor composition table to find physical processors having an empty processor amount. The decided physical processor is used to newly create a logical computer. Step 1303 adds the logical computer created in step 1302 to the cluster. This processing is described later in detail using a flow chart. Step 1304 updates the table. In the physical processor composition information table, the empty processor amounts 803 are decreased by an amount assigned to the logical computer. The logical processor composition information management table is added with information of the assigned logical computer or is updated.

Figure 14:
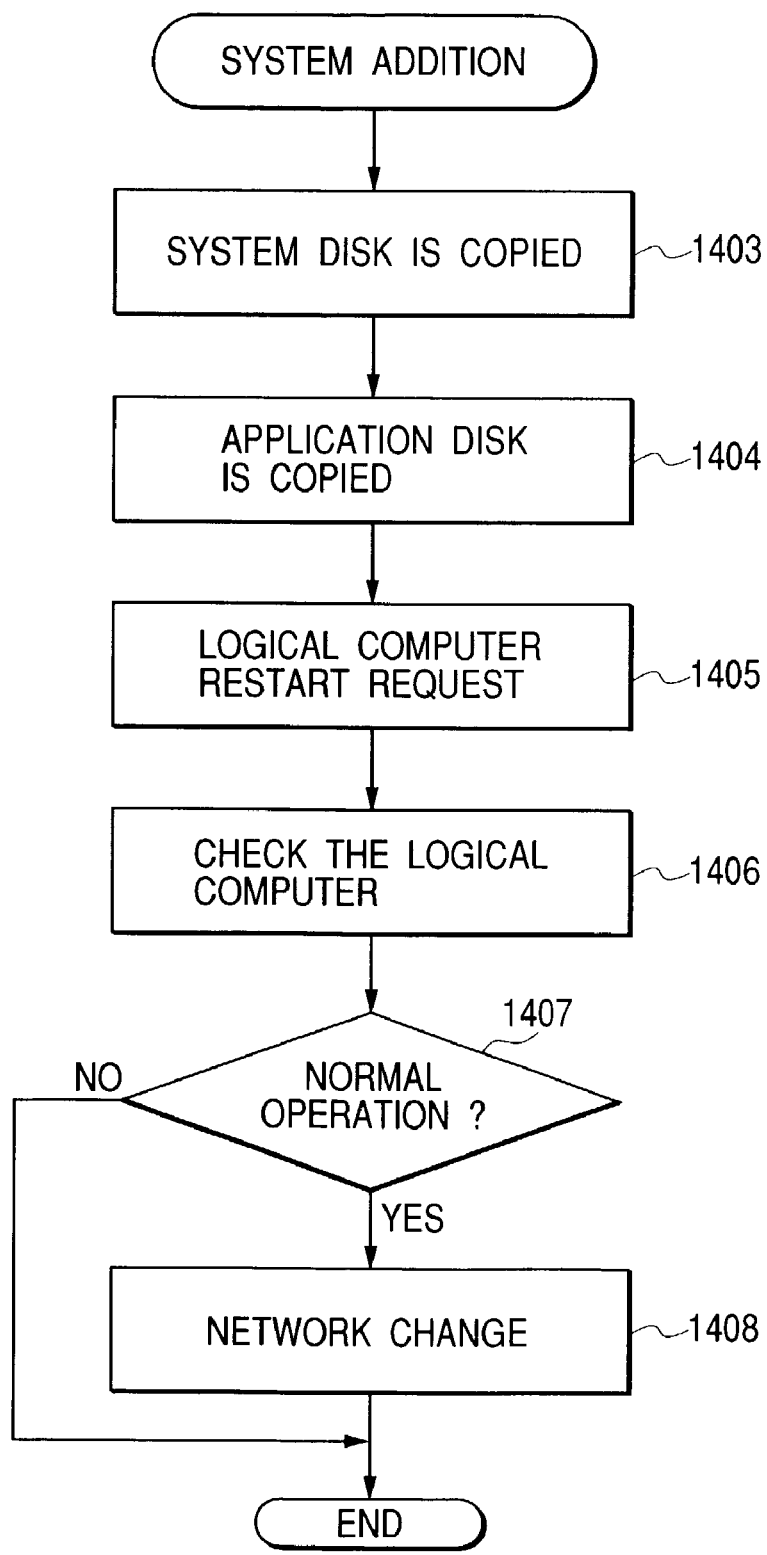
FIG. 14 is a diagram showing a flow of addition of a logical computer in one embodiment of the present invention.

FIG. 14 is a detailed flowchart showing system addition to a cluster (step 1303) in FIG. 13. Step 1403 copies a system disk of a failed logical computer to a disk of the newly created logical computer. Step 1404 copies an application disk. Step 1405 starts the newly created logical computer, using the disks copied in the steps 1403 and 1404. Thereby, a system of the same environment as the failed processor can be started. A method different from the method by the steps 1403 to 1405 is not to copy disks. Although the system disk and the application disk have been copied in the steps 1403 and 1404, if disks having been used in a failed system can be shared by the newly created logical computer, by executing the step 1405 after connection to the newly created logical computer, the overhead of disk copying can be eliminated. Step 1406 determines whether the newly created logical computer has been correctly started. Step 1407, if the newly created logical computer has been correctly started, transfers control to step 1408, which changes the network and terminates the system addition processing. By the above processing, the newly created logical computer has been added to the cluster system, which can be restored to the same environment as it was before a failure occurred.

Figure 15:
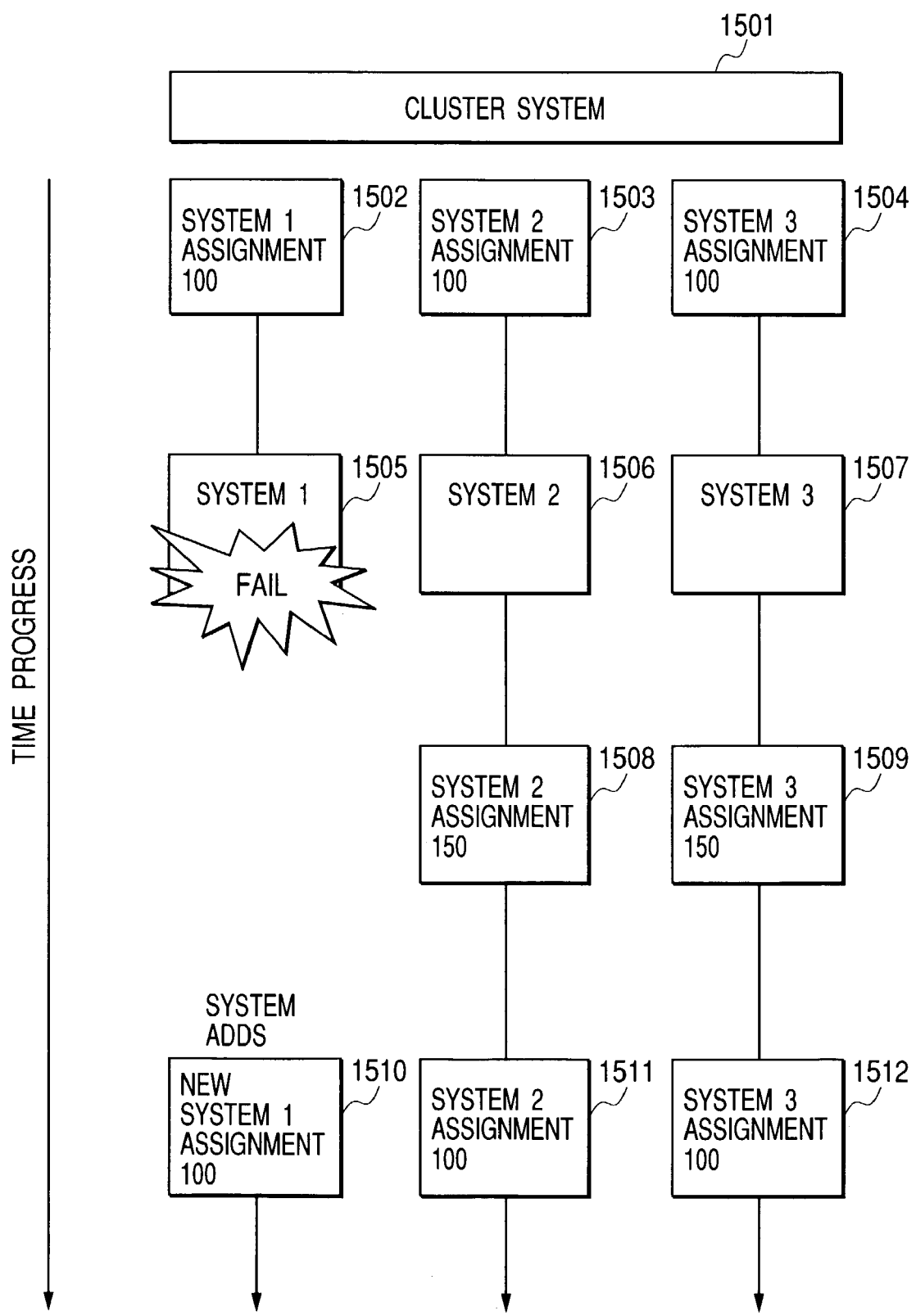
FIG. 15 is a diagram showing failure processing in one embodiment of the present invention.

FIG. 15 shows failure processing in the above embodiment. As a cluster 1501, three logical computers 1502 to 1504 normally operate. If a failure occurs in a logical computer 1 (1505), in order that a logical computer 2 (1508) and a logical computer 3 (1509) can continue processing without significantly reducing a service level, their assignment amounts of physical processors are temporarily increased. When a new logical computer is added (1510), the logical computers 2 (1508) and 3 (1509) are restored to their previous physical processor assignment amounts and the cluster can be restored to the same environment as it was before the failure occurred. Although a method of achieving high reliability based on logical computers has been described in this embodiment, the same method can also apply to virtual computers to achieve speedup.

An effect of this embodiment is that, when clusters are to be built on logical computers, reliability can be increased by building a cluster system with logical computers assigned to different physical processors. When a failure occurs, reduction in service can be prevented by increasing the physical processor amounts of active logical computers for the duration of failure recovery.

Although a cluster system has been described in this embodiment, a hot standby system can be formed with one logical computer as an active computer and another logical computer as a hot standby computer, which is set to a physical processor different from a physical processor to which the logical computer used as an active computer is set. In this case, even if a failure occurs in the physical processor to which the active computer is set, the hot standby computer can take over processing for execution.

Although assignment of physical processors and logical processors has been described in this embodiment, high reliability can also be achieved for resources other than the physical processors by using the same method. For example, as for network devices, by assigning different network devices within an identical cluster, the same effect as in the embodiment can be obtained for failures of the network devices.

According to the present invention, the reliability of a system using plural logical computers can be increased.

What is claimed is:

1. A multiple computer system, comprising:
   plural physical processors;
   logical computers of which one or more are set to each of said plural physical computers; and
   means, when said physical processors fail, for adding a logical computer to said cluster,
   wherein a cluster system or hot standby is built using said plural logical computers which are set dispersedly to the different physical processors, and
   said added logical computer is set to a physical processor different from physical processors to which said logical computers constituting said cluster are set.

2. The multiple computer system according to claim 1, wherein said logical computers are set so that processor processing amounts required as the cluster system are dispersedly assigned to said plural logical computers.

3. The multiple computer system according to claim 1, further comprising means, when a software failure occurs in said logical computers, for restarting the logical computers.

4. A multiple computer system, comprising:
   plural physical processors; and
   logical computers of which one or more are set to each of said plural physical computers,
   wherein a cluster system or hot standby is built using said plural logical computers which are set dispersedly to the different physical processors, and
   when said logical computers are set, said logical computers are set to the physical processors, leaving some processor amounts for the physical processors.

5. A computer program product having a computer readable medium with computer readable program codes store thereon, said computer readable codes comprising a program for assigning logical computers, to assign logical computers in a computer system having plural physical processors to which one or more logical computers can be set, comprising:
   first means for deciding a processor assignment amount for each of logical computers constituting a cluster system;
   second means for finding said physical processors having empty processor amounts, and setting logical computers constituting the cluster system to said found processors; and
   third means for finding physical processors having empty processor amounts which are different from said physical processors found previously, and setting other logical computers constituting the cluster system to said found physical processor, wherein the first means make a decision to leave empty processor amounts for said physical processors.

* * * * *